United States Patent [19]

Mauck et al.

[11] 4,412,330
[45] Oct. 25, 1983

[54] Q-SWITCHED LASER WITH STABLE OUTPUT AND METHOD OF MAKING THE SAME

[75] Inventors: Michael S. Mauck; William S. Neeland, both of Portland, Oreg.

[73] Assignee: Electro Scientific Industries, Inc., Portland, Oreg.

[21] Appl. No.: 254,895

[22] Filed: Apr. 16, 1981

[51] Int. Cl.³ ............................................. H01S 3/13
[52] U.S. Cl. ..................................... 372/29; 372/13
[58] Field of Search ................. 372/13, 25, 30, 31, 372/32

[56] References Cited

U.S. PATENT DOCUMENTS 3,737,231 6/1973 Low et al. .......................... 372/25
3,747,019 7/1973 Koechner et al. ................. 372/30
4,337,442 7/1982 Mauck ................................ 372/29

Primary Examiner—William L. Sikes
Assistant Examiner—Léon Scott, Jr.
Attorney, Agent, or Firm—Oliver D. Olson

[57] ABSTRACT

The Q-switched laser gating pulses of an acousto-optic Q-switch are synchronized electrically to the phase of the RF signal driving the Q-switch by applying the RF oscillator output signals to the clock input of an integrated circuit D-type flip-flop and the laser gating pulses to the D input of the flip-flop, whereby the leading edge of each output gating pulse from the flip-flop always occurs at a particular place on the RF waveform. In another embodiment, the RF signals are synchronized to the phase of the gating pulses by applying the output of a repetition rate oscillator to the RF oscillator.

12 Claims, 4 Drawing Figures

Q-SWITCHED LASER WITH STABLE OUTPUT AND METHOD OF MAKING THE SAME

BACKGROUND OF THE INVENTION

This invention relates to Q-switched lasers and more particularly to a Q-switched laser having an output of high stability.

In Q-switched lasers of the prior art, the difference between the modulation on the laser beam by different decaying RF signals contributes to instability of a certain portion of the laser output, and the magnitude of this instability is a function of the gating repetition rate. Instability is also caused by varying input power, cavity alignment, or any other factor that modulates laser pulse build-up time.

SUMMARY OF THE INVENTION

In its basic concept, this invention provides a Q-switched laser of high stability by synchronizing the laser gating pulses and the phase of the RF signal.

It is by virtue of the foregoing basic concept that the principle objective of this invention is achieved; namely to overcome the instability of laser output characterizing Q-switched lasers of the prior art.

Another object of this invention is the provision of Q-switched laser of the class described characterized in that when the gating repetition rate is varied to produce laser output Q-switched pulses of different rates, a reproducible output is obtained.

Another object of this invention is to provide a method by which the output of Q-switched lasers may be rendered highly stable.

The foregoing and other objects and advantages of this invention will appear from the following detailed description, taken in connection with the accompanying drawings of preferred embodiments.

DESCRIPTION OF THE PREFERRED EMBODIMENT

Figure 1:
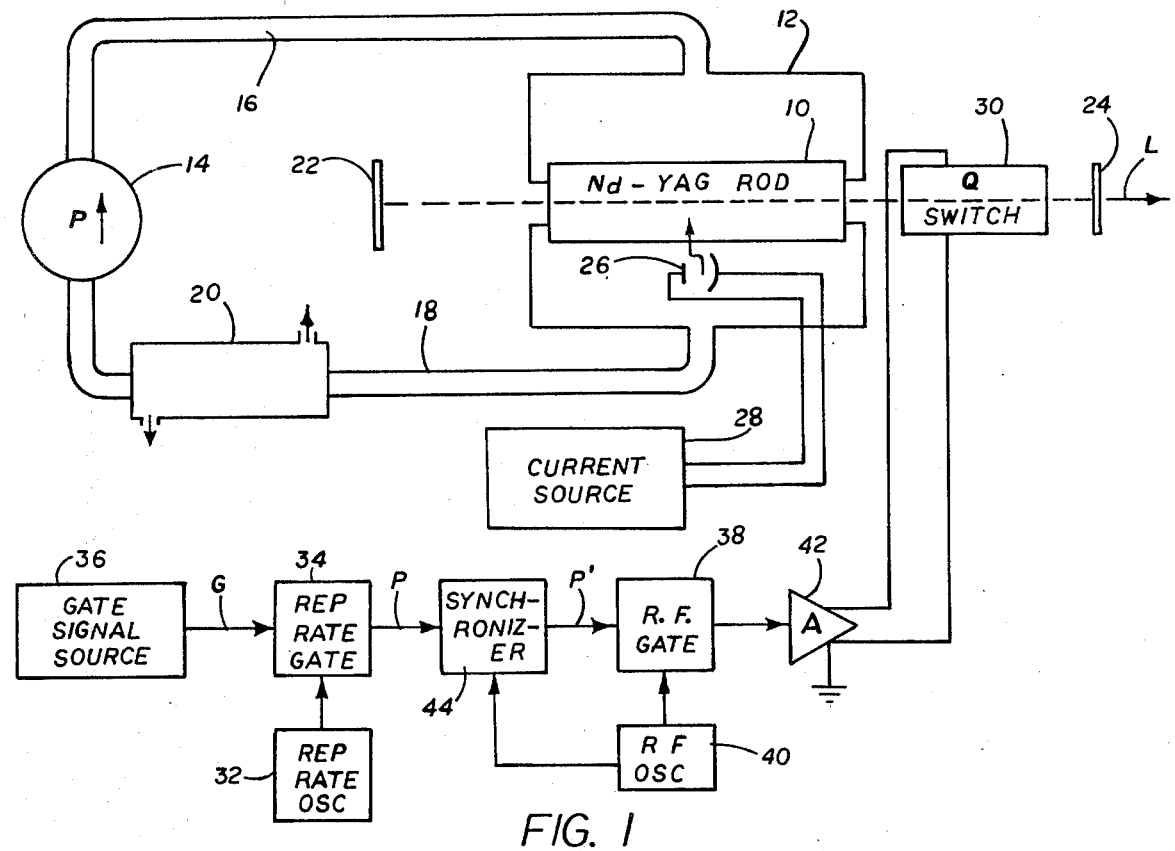
FIG. 1 is a schematic electrical diagram illustrating the method and means for producing a high stability output Q-switched laser in accordance with the present invention.
Figure 2:
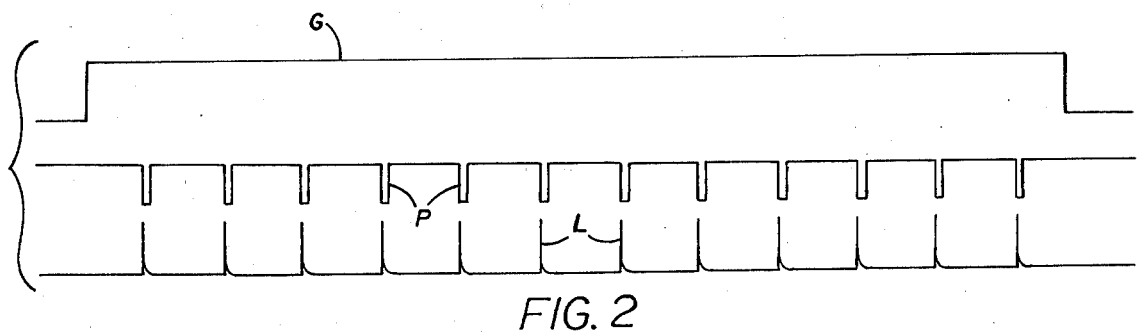
FIG. 2 is a graphic representation of a plurality of a electrical waveforms of electric signals and laser output illustrating the operation of an conventional acousto-optic Q-switched laser.

For purposes of illustration, FIG. 1 shows schematically the structural arrangement of a conventional acousto-optic Q-switched laser. Thus, an elongated Nd: YAG rod 10 is mounted in a heat exchanger 12 through which a cooling liquid is circulated by means of a pump 14 and the interconnecting pipes 16 and 18. A second heat exchanger 20 encircles a portion of the upstream pipe 18 for cooling the liquid prior to its return to the heat exchanger 12. The second heat exchanger 20 typically provides cooling by means of tap water.

The ends of the laser rod 10 are exposed so that its longitudinal axis extends unobstructed between mirrors 22 and 24 spaced outwardly from the opposite ends of the rod.

The laser also includes a continuously pumped light source. For the Nd: YAG rod illustrated, the light source is a krypton arc lamp 26 connected to a source 28 of direct current.

An acousto-optic Q-switch 30 is shown interposed between the mirror 24 and the confronting end of the rod 10. The Q-switch is gated at a predetermined repetition rate by means of gating pulses P produced by a repetition rate oscillator 32 and applied to a repetition rate gate 24 to which a gate signal G is applied by a gate signal source 36. The gating pulses P normally are applied to an RF gate 38 to which an RF signal is applied from an RF oscillator 40. The gating pulses P interrupt the RF signal to amplifier 42 and hence to Q-switch 30. During this time of interruption the laser output pulse L builds up and is emitted from the laser.

In accordance with this invention, the laser output from the Q-switched laser is rendered highly stable by electrically synchronizing the Q-switch gating signal and the phase of the RF signal driving the Q-switch. Locking the gating signal to any particular phase of the RF signal produces more stable Q-switch output pulses, because the decaying envelope of the RF signal, as it is turned off by the gating signal, modulates the beginning of the laser power as it builds up in the laser cavity. It is the difference between the modulation on the laser beam by different decaying RF signals which contributes to a certain portion of laser output instability. Locking the gating signal to an arbitrary position on the RF signal of any fixed phase, causes each successive decaying RF envelope to be similar and results in uniform modulation of laser output pulses.

Referring to FIG. 1 of the drawing, synchronization of the Q-switch gating signal and the phase of the RF signal, is achieved by interposing between the repetition rate gate 34 and RF gate 38, a synchronizer 44 which functions operatively to interconnect the output of the repetition rate gate 34 and the RF oscillator 40, to synchronize the laser gating pulses to the phase of the RF signals.

A specific embodiment of the synchronizer 44 is an integrated circuit 7474 D-type flip-flop. The output pulses P from the repetition rate gate 34 are applied to the D input of the flip-flop 44; the RF output from the oscillator 40 is applied to the clock input of the flip-flop; and the output of the flip-flop is connected to the input of the RF gate 38.

Figure 3:
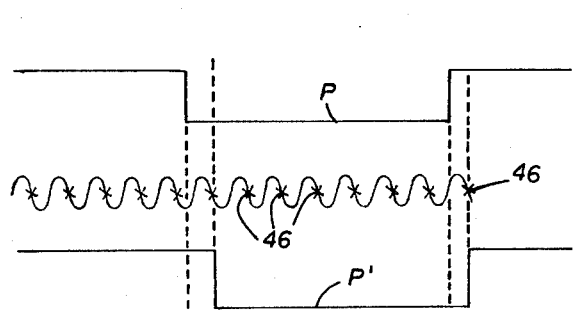
FIG. 3 is a graphic representation of a plurality of electrical waveforms showing one of the waveforms of FIG. 2 on a time expanded scale and illustrating the manner in which it is synchronized in accordance with the present invention.

Referring to FIG. 3 of the drawing, one of the pulses P is shown in time expanded scale, for clarity, associated with a sine wave output from the RF oscillator. It will be appreciated that the output of the RF oscillator may be a square wave or any other desired form of repetitive wave. In any case, this oscillator output is applied at the clock input of the flip-flop, whereby it clocks, or synchronizes the pulses P so that the leading and trailing edges of the pulses P' always occur at a particular place on the illustrated sine wave.

It is to be noted that if the trailing edge of the pulse P does not align with the arbitrary phase synchronization point 46 on the sine wave, the next clock signal generates the trailing edge of the pulse P'. Accordingly, the pulses P and P' may be of the same or shorter or longer duration with respect to each other.

Of significance, however, is the synchronization of the leading edge of the pulses P, since it is the leading edge that is related to the laser output pulse L.

The synchronizing arrangement described hereinbefore provides the advantage that when the gating repetition rate is varied to produce laser output Q-switched pulses of differing rates, a reproducible output is obtained. This occurs because for different rates, output pulses take different time to build up and be emitted from the laser. Accordingly, although the laser pulses for different repetition rates are modulated by different portions of the decaying RF envelope, subsequent pulses at each repetition rate are modulated by similar portions of the decaying RF envelope.

If no synchronization is used, the magnitude of instability is a function of rate. Similarly, differing instability is caused by varying input power, cavity alignment, or anything that modulates laser pulse build-up time.

Figure 4:
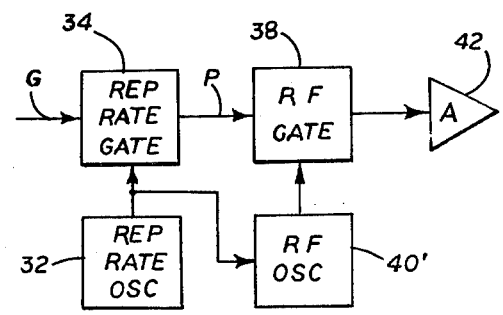
FIG. 4 is a fragmentary schematic electrical diagram of a modification of FIG. 1 illustrating an alternative method and means by which to produce a high stability output Q-switched laser in accordance with this invention.

In the embodiment illustrated in FIG. 4, synchronization of the laser gating pulses and the phase of the RF signals is achieved by synchronizing an RF oscillator 40' by a derivative of the gate signal P. As illustrated, this is achieved by driving an RF oscillator by the output signals of the repetition rate oscillator 32. In this manner the RF signal is synchronized to the phase of the laser gating pulses P. This arrangement is particularly suitable for use under conditions wherein the laser gating pulses occur at a fixed frequency.

Although the methods and systems have been described hereinbefore with reference to an acousto-optic Q-switched laser, the present invention may also be employed with electro-optic Q-switched lasers modified to provide RF excitation.

It will be apparent to those skilled in the art that various changes may be made in the type, number and arrangement of parts described hereinbefore without departing from the spirit of this invention and the scope of the appended claims.

Having now described our invention and the manner in which it may be used, we claim:

1. In a Q-switched laser having an acousto-optic Q-switch driven intermittently by RF signals having a repetitive wave and interrupted periodically by laser gating pulses having leading and trailing edges, the method of stabilizing the output laser pulses comprising synchronizing the laser gating pulses and the phase of the RF signals with each other.

2. The method of claim 1 wherein the synchronizing is achieved by synchronizing the laser gating pulses to the phase of the RF signals.

3. The method of claim 1 wherein the synchronization is achieved by synchronizing the RF signals to the phase of the laser gating pulses.

4. The method of claim 1 wherein the synchronizing is achieved by applying the laser gating pulses to the input of a flip-flop, the RF signals to the clock input of the flip-flop, and the output of the flip-flop to the input of an RF gate the output of which is applied to the Q-switch 5. The method of claim 1 wherein the Q-switched laser is an acousto-optic Q-switched laser in which the laser gating pulses are produced by a repetition rate oscillator and applied to a repetition rate gate to which a gate signal is applied by a gate signal source, and the output of an RF oscillator is applied to an RF gate the output of which is applied to the Q-switch, and the synchronizing is achieved by applying the output of the repetition rate gate to the D input of an integrated circuit D-type flip-flop, the output of the RF oscillator to the clock input of the flip-flop and the output of the flip-flop to the input of the RF gate.

6. The method of claim 1 wherein the laser gating pulses are produced by a repetition rate oscillator and the synchronization is achieved by applying the output signals of the repetition rate oscillator to an input of a source of said RF signals.

7. In a Q-switched laser having a source of laser gating pulses having leading and trailing edges and a source of RF signals having a repetitive wave, and an acousto-optic Q-switch driven intermittently by RF signals from said source interrupted periodically by laser gating pulses from said source, means for stabilizing the output laser pulses, comprising synchronizing means operatively interconnecting the source of laser gating pulses and the source of RF signals for synchronizing the laser gating pulses and the phase of the RF signals with each other.

8. The stabilizing means of claim 7 wherein the source of laser gating pulses includes a repetition rate oscillator and the synchronizing means connects the output of the repetition rate oscillator to the source of RF signals for synchronizing the RF signals to the phase of the laser gating pulses.

9. The stabilizing means of claim 7 wherein the synchronizing means operatively interconnects the output of the source of laser gating pulses and the output of the source of RF signals for synchronizing the laser gating pulses to the phase of the RF signals.

10. The stabilizing means of claim 9 wherein the synchronizing means comprises a flip-flop having an input connected to the output of the source of laser gating pulses, a clock input connected to the output of the source of RF signals and an output connected to the input of an RF gate.

11. The stabilizing means of claim 9 wherein the Q-switched laser is an acousto-optic Q-switched laser in which the laser gating pulses are produced by a repetition rate oscillator and applied to a repetition rate gate to which a gate signal is applied by a gate signal source and the output of an RF oscillator is applied to an RF gate the output of which is applied to the Q-switch, and wherein the synchronizing means comprises an integrated circuit D-type flip-flop having the D input connected to the output of the repetition rate gate, a clock input connected to an output of the RF oscillator and an output connected to the RF gate.

12. The stabilizing means of claim 9 wherein the Q-switched laser is an acousto-optic Q-switched laser in which the laser gating pulses are produced by a repetition rate oscillator and applied to a repetition rate gate to which a gate signal is applied by a gate signal source, and the output of an RF oscillator is applied to an RF gate the output of which is applied to the Q-switch, and wherein the synchronizing means comprises means connecting the output of the repetition rate oscillator to the RF oscillator for synchronizing the RF signals to the phase of the laser gating pulses.

* * * * *